March 27, 1962  J. E. KASTEN  3,026,735
RELEASE MECHANISM

Filed April 15, 1959  3 Sheets-Sheet 1

*INVENTOR.*
JOHN E. KASTEN
BY
ATTORNEY

March 27, 1962     J. E. KASTEN     3,026,735
RELEASE MECHANISM
Filed April 15, 1959     3 Sheets-Sheet 2
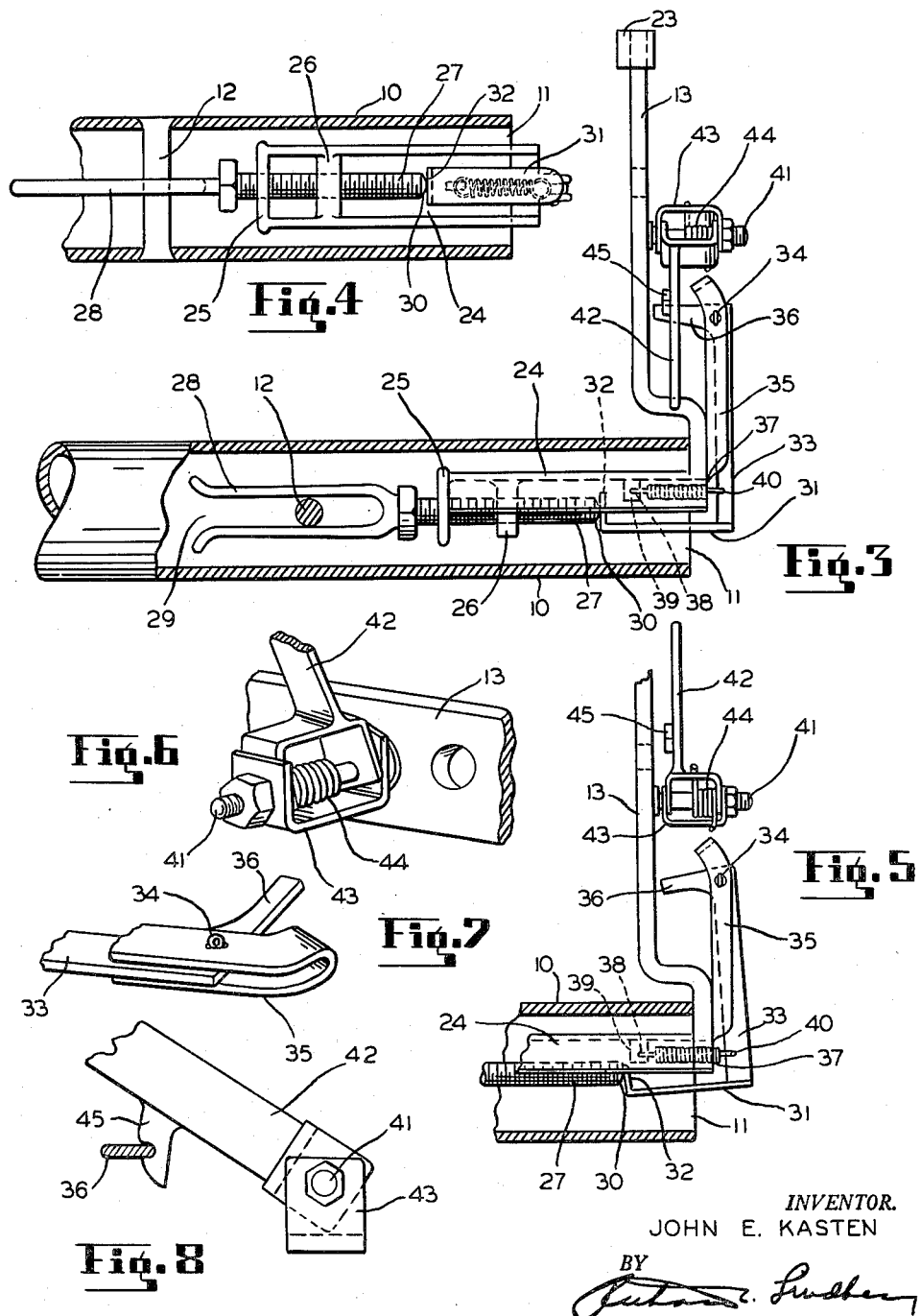
INVENTOR.
JOHN E. KASTEN

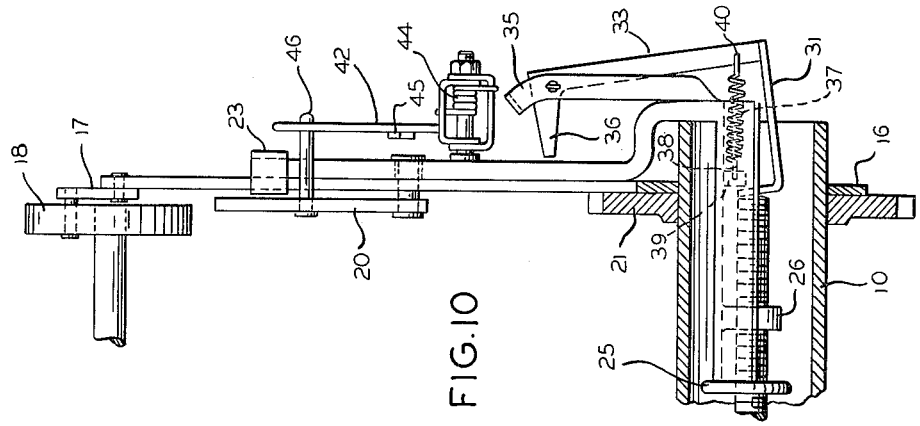
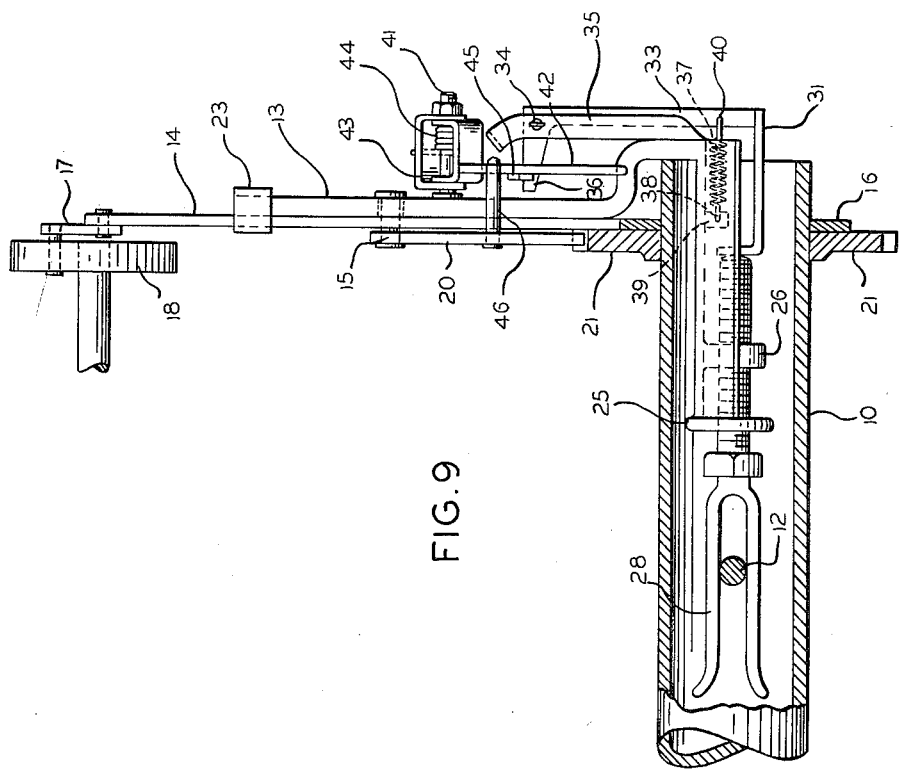

United States Patent Office 3,026,735
Patented Mar. 27, 1962

3,026,735
RELEASE MECHANISM
John E. Kasten, % Kasten Manufacturing Corp., Allentown, Wis.
Filed Apr. 15, 1959, Ser. No. 806,664
3 Claims. (Cl. 74—150)

This invention relates to a release mechanism, and more particularly to a mechanism for releasing a ratchet arrangement, or the like.

Those familiar with the art of forage wagons or the like know that the distribution of stock food deposited into feed troughs or the like is accomplished by the slidable movement of a gate employed for forcing the forage toward the unloading end of the wagon. Such gates are generally moved by means of a cable disposed over a winch and it is desirable that the cable drive for the winch be controlled in a manner to prevent the tail gate from traveling too far toward the unloading end of the wagon box, and that the tail gate be stopped at a predetermined position. The device described herein is designed to be actuated by the roller or cable drum of the winch arrangement, and to provide a means for releasing the dog on the ratchet drive when the tail gate has reached a predetermined position.

The device is also applicable for use with many types of mechanical devices. It is simple in construction, easy to apply, economical to manufacture, yet highly efficient for the purpose for which it is intended.

It is a principal object of this invention to provide a release for a ratchet operated winch, so that only a predetermined number of revolutions of the winch drum will be had.

Another object is to provide a device of the character described that is capable of releasing a drive mechanism instantaneously.

Other and further objects of the invention will become more apparent as the description proceeds when taken in conjunction with the drawings in which:

FIG. 3 is a plan view thereof, shown in position with a hollow cable winding drum;

FIG. 4 is a longitudinal sectional view showing details of part of the release mechanism;

FIG. 5 is a fragmentary plan view showing the release mechanism in its released position;

FIG. 6 is a fragmentary perspective view showing details of the spring actuated release lever;

FIG. 7 is a fragmentary detailed perspective view showing details of a release finger for the release lever seen in FIG. 6;

FIG. 8 is a side view of the release lever seen in FIGS. 6 and 7;

FIG. 9 is a plan view similar to FIG. 3, certain parts being shown in section, showing the release mechanism in an unreleased position; and FIG. 10 is a view similar to FIG. 9, but showing the release mechanism in its released position.

Figure 1:
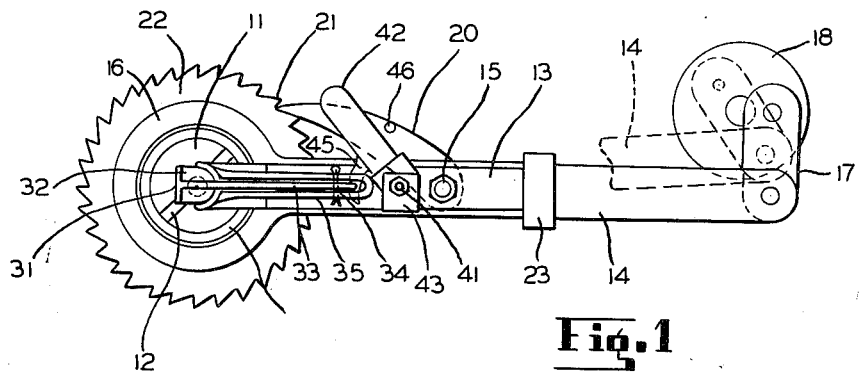
FIG. 1 is a side view of a release mechanism embodying the improvements according to the present invention.
Figure 2:
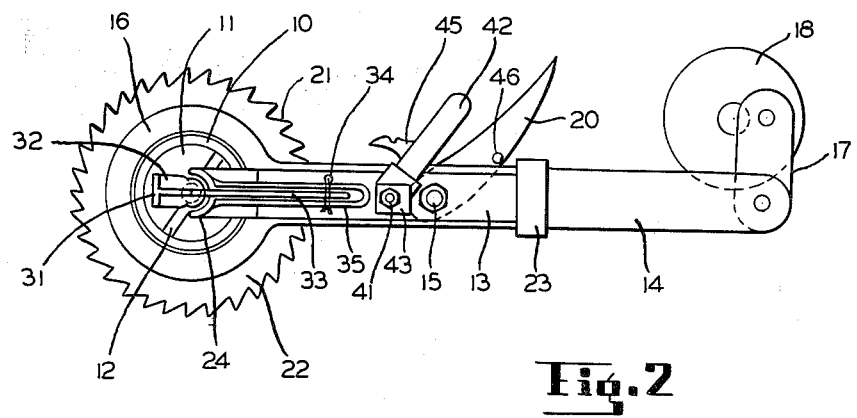
FIG. 2 is a view similar to FIG. 1 showing the release mechanism in a released position.

Referring now to the drawings, the reference numeral 10 shows a winch drum forming a part of the winch mechanism upon which a cable, not shown, is wound.

The winding drum 10 is open at one end 11 and has a diametrically extending pin 12 therein located at a point inward from the open end 11 thereof.

The winding drum 10 has fast thereon a ratchet wheel 22 having teeth 21, the wheel 22 being advanced step by step by a pawl 20 pivotally connected by a bolt 15 to a link 14.

The link 14 has a journal 16 at one end thereof fitting within the winch drum 10, and the other end of the link 14 is pivotally connected to a second link 17 connected to a crank 18.

An auxiliary arm 13 is also connected to the link 14 by the bolt 15 and a strap 23 which fits over the top and bottom edges of the lever 14 for its support.

The forward end of the arm 13 has an extension 24 at right angles thereto which extends into the open end 11 of the winch drum 10. Extension 24 has an end support 25 and a support 26 spaced therefrom for supporting a threaded contact rod member 27. The contact rod 27 is in threading engagement with supports 25 and 26 and is provided with a yoke member 28 at one end thereof having spaced tines 29 which engage the diametrically extending pin 12. As the cable drum 10 revolves, the pin 12 will revolve with it, and yoke member 28 will revolve therewith, thereby advancing the threaded contact rod member 27 within the supports 25 and 26.

The contact rod 27 has an end 30 thereof in engagement with a contact member 32 of a release device 31 having an arm 33 extending rearward therefrom along the arm 13. The arm 33 is pivotally attached at 34 to a guide member 35 forming a part of the lever 13.

Release arm 33 has an extension 36 therefrom, and the arm 33 is normally kept in a parallel position to the arm 13 by means of a spring 37 attached at one end 38 to a member 39 projecting from the inwardly extending arm 24, and at the other end as at 40 to the lever 33.

A rock arm 42 is adapted to engage the extension 36, as seen in FIG. 8, and is supported within a bracket 43 secured to auxiliary arm 13 by a bolt 41. The lever 42 is biased to a release position by means of a coil spring 44 supported by the bolt 41. Rock arm 42 is also provided with a catch 45 which is designed to engage the edge of the extension 36 on the arm 33, as shown in FIG. 8, and when the threaded contact rod 27 reaches a position as seen in FIG. 5, where it pushes the release member 31, it will move the extension 36 out of engagement with the catch 45 on the rock arm 42. The lever is urged backward by the spring 44, and the rock arm 42 will engage a pin 46 extending from the pawl 20. The pawl 20 will thus be released from engagement with the teeth 21 of the ratchet wheel 22, and without stopping the driving mechanism shown by the crank 18, the lever 14 will oscillate to and fro, the winch drum 10 no longer turning.

In the exemplification of my device, there are many features not heretofore disclosed in the prior art, and although I have illustrated and described a specific manner of its construction, and showing the component parts in a particular arrangement, I am fully cognizant of the fact that many changes in the form and configuration of the component parts may be made without effecting their operativeness, the spirit of my invention, or the scope of the appended claims.

Having thus described my invention, what I claim and desire to secure by Letters Patent in the United States is:

1. In a mechanism of the class described for driving a winch in step-by-step fashion and for releasing the driving effort thereto upon a predetermined number of turns of said winch, a hollow winch drum having a ratchet wheel mounted thereon, means for advancing said drum in step-by-step fashion including a first link journaled on said drum, a crank spaced from said drum and a second link connecting said crank and said first link, a pawl in engagement with said ratchet wheel and pivotally supported on said first link and adapted to turn said drum upon rotation of said crank, means for lifting said pawl from engagement with said drum comprising a rock arm and a spring biasing said rock arm in a position toward said pawl, a releasable latch pivotally mounted on a first extension of the first link and holding said rock arm away from a pawl lifting position, means for releasing said latch comprising a threaded contact member slidably connected to the drum and adapted to rotate with said drum and therewithin, a second extension from said first link threadably engaged with said contact member, a second member connected to pivot with said latch and engaged by the end of said threaded contact member to rock the second member in order to release the latch.

2. In a mechanism of the class described for driving a winch in step-by-step fashion and for releasing the driving effort thereto upon a predetermined number of turns of said winch, a hollow winch drum having a ratchet wheel mounted thereon, means for advancing said drum in step-by-step fashion including a first link journaled on said drum, a crank spaced from said drum and a second link connecting said crank and said first link, a pawl in engagement with said ratchet wheel and pivotally supported on said first link and adapted to turn said drum upon rotation of said crank, means for lifting said pawl from engagement with said drum comprising a rock arm and a spring biasing said rock arm in a position toward said pawl, a releasable latch pivotally mounted on said first link and holding said rock arm away from a pawl lifting position, means for releasing said latch comprising a threaded contact member slidably connected to the drum and adapted to rotate with said drum and therewithin, structure extending from said first link and within said drum and threadably engaged with said contact member, and structure forming a part of said latch and engaged by the end of said threaded contact member to rock the second member in order to release the latch.

3. In a mechanism of the class described for driving a winch in step-by-step fashion and for releasing the driving effort thereto upon a predetermined number of turns of said winch, a hollow winch drum having a ratchet wheel mounted thereon, means for advancing said drum in step-by-step fashion including a first link journalled on said drum, a crank spaced from said drum and a second link connecting said crank and said first link, a pawl in engagement with said ratchet wheel and pivotally supported on said first link and adapted to turn said drum upon rotation of said crank, means for lifting said pawl from engagement with said drum comprising a rock arm and a spring biasing said rock arm in a direction to lift said pawl, a latch for said pawl pivotally mounted on said first link and holding said rock arm away from a pawl lifting position, means for releasing said latch comprising a threaded contact member slidably connected to the drum and adapted to rotate with said drum and therewithin, structure extending from said first link threadably engaged with said contact member, and structure forming a part of said latch and engaged by the end of said threaded contact member to rock the second member in order to release the latch.

References Cited in the file of this patent
UNITED STATES PATENTS
1,404,853     Heany _____ Jan. 31, 1922